(12) United States Patent
Han et al.

(10) Patent No.: US 10,133,470 B2
(45) Date of Patent: Nov. 20, 2018

(54) INTERFACING DEVICE AND METHOD FOR PROVIDING USER INTERFACE EXPLOITING MULTI-MODALITY

(71) Applicant: SAMSUNG ELECTRONICS CO., LTD., Suwon-si, Gyeonggi-do (KR)

(72) Inventors: Jae Joon Han, Seoul (KR); Seung Ju Han, Seoul (KR); Du-Sik Park, Suwon-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 14/046,017

(22) Filed: Oct. 4, 2013

(65) Prior Publication Data

US 2014/0101604 A1  Apr. 10, 2014

Related U.S. Application Data

(60) Provisional application No. 61/713,822, filed on Oct. 15, 2012, provisional application No. 61/711,359, filed on Oct. 9, 2012.

(30) Foreign Application Priority Data

Jun. 13, 2013  (KR) .................. 10-2013-0067516

(51) Int. Cl.
*G06F 3/048* (2013.01)
*G06F 3/0487* (2013.01)
*G06F 3/038* (2013.01)

(52) U.S. Cl.
CPC ............ *G06F 3/0487* (2013.01); *G06F 3/038* (2013.01); *G06F 2203/038* (2013.01)

(58) Field of Classification Search
None
See application file for complete search history.

(56) References Cited

U.S. PATENT DOCUMENTS

| | | | |
|---|---|---|---|
| 2004/0001100 A1* | 1/2004 | Wajda ................... | G06F 9/4448 715/778 |
| 2009/0265422 A1 | 10/2009 | Park et al. | |
| 2011/0310094 A1 | 12/2011 | Park et al. | |
| 2012/0105257 A1* | 5/2012 | Murillo .................. | G06F 3/017 341/20 |
| 2012/0117514 A1* | 5/2012 | Kim et al. .................... | 715/849 |
| 2012/0235899 A1 | 9/2012 | Han et al. | |
| 2012/0246223 A1* | 9/2012 | Newhouse ............... | G06F 3/01 709/203 |
| 2013/0021374 A1* | 1/2013 | Miao ....................... | G06F 3/011 345/633 |

(Continued)

FOREIGN PATENT DOCUMENTS

| | | |
|---|---|---|
| JP | 2010-081466 | 4/2010 |
| KR | 10-2010-0004438 | 1/2010 |
| KR | 10-2010-0088042 | 8/2010 |

(Continued)

*Primary Examiner* — William C Trapanese
(74) *Attorney, Agent, or Firm* — NSIP Law

(57) ABSTRACT

An interfacing device for providing a user interface (UI) exploiting a multi-modality may recognize at least two modality inputs for controlling a scene, and generate scene control information based on the at least two modality inputs.

19 Claims, 8 Drawing Sheets

(56) References Cited

U.S. PATENT DOCUMENTS

2013/0113891 A1* 5/2013 Mayhew ............ H04N 13/0239
348/47
2013/0342571 A1* 12/2013 Kinnebrew ............. G06F 3/147
345/633

FOREIGN PATENT DOCUMENTS

| KR | 10-2010-0121420 | 11/2010 |
| KR | 10-2010-0138707 | 12/2010 |
| KR | 10-2011-0114793 | 10/2011 |
| KR | 10-2012-0016379 | 2/2012 |

* cited by examiner

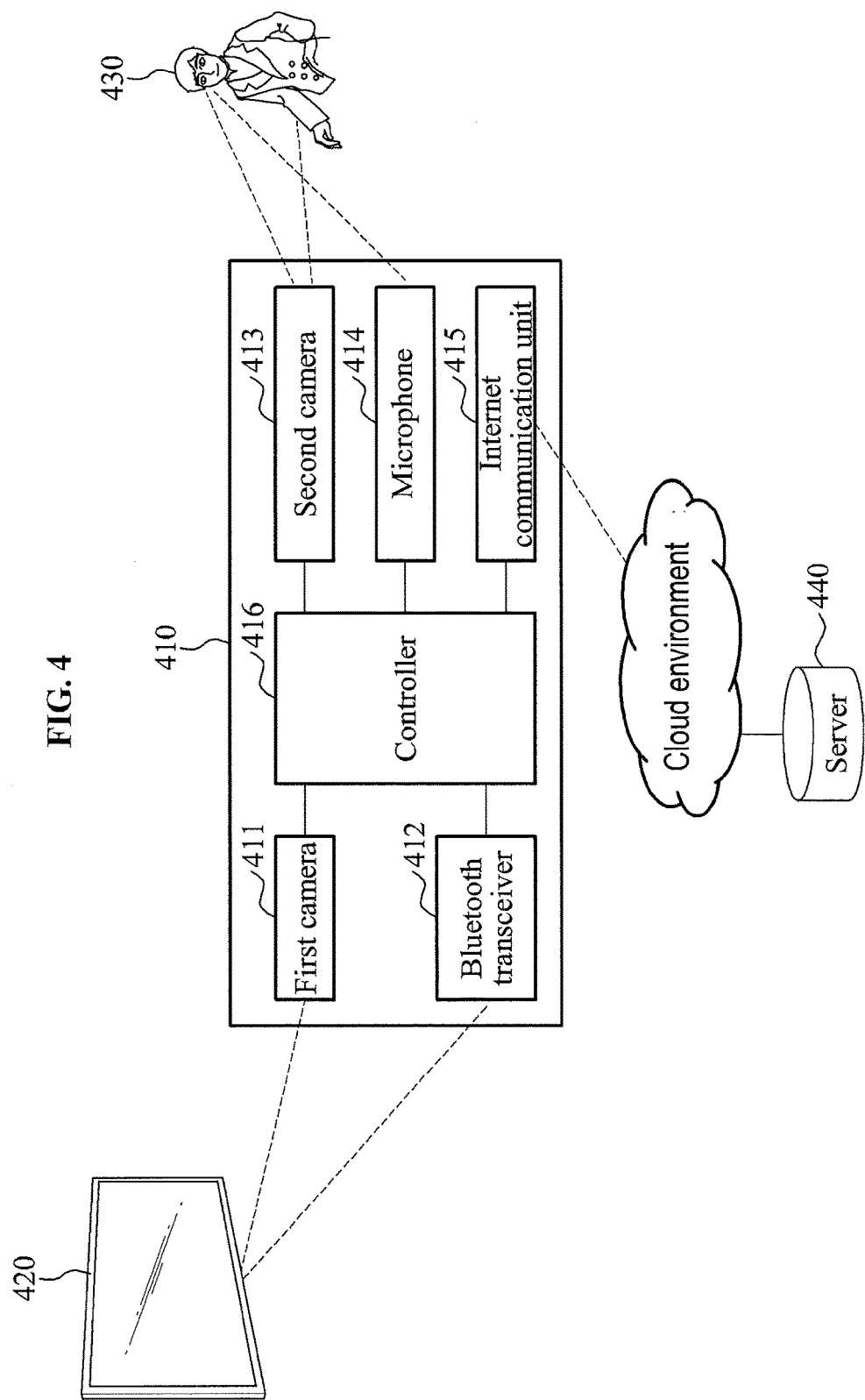

INTERFACING DEVICE AND METHOD FOR PROVIDING USER INTERFACE EXPLOITING MULTI-MODALITY

CROSS-REFERENCE TO RELATED APPLICATIONS

This application claims the priority benefit of U.S. Provisional Application No. 61/711,359, filed on Oct. 9, 2012, in the U.S. Patent and Trademark Office, U.S. Provisional Application No. 61/713,822, filed on Oct. 15, 2012, in the U.S. Patent and Trademark Office, and Korean Patent Application No. 10-2013-0067516, filed on Jun. 13, 2013, in the Korean Intellectual Property Office, the disclosures of which are incorporated herein by reference.

BACKGROUND

1. Field

One or more embodiments relate to an interfacing device and method for providing a user interface exploiting a multi-modality.

2. Description of the Related Art

Human sensing technologies may provide an intuitive user interface. The human sensing technologies are being adopted in various consumer electronics.

In general, the human sensing technologies may be implemented to perform an action corresponding to a detected gesture when a predetermined gesture for controlling the various consumer electronics is detected.

SUMMARY

The foregoing and/or other aspects may be achieved by one or more embodiments providing an interfacing device for providing a user interface (UI) exploiting a multi-modality, the device possibly including a parameter obtainer to obtain a scene parameter comprising information related to a scene, a multi-modality recognizer to recognize at least two modality inputs for controlling the scene, and a scene control information generator to generate scene control information based on the scene parameter and the at least two modality inputs.

The device may further include a user customization parameter obtainer to obtain a user customization parameter, and the scene control information generator may include an interpreter to interpret a combination of the at least two modality inputs based on the user customization parameter.

The user customization parameter may include mapping information corresponding to a predetermined user and the mapping information may be used to map each control aspect of a plurality of predetermined scenes to one of a plurality of modality inputs or at least two combinations selectable from the plurality of modality inputs, based on a preference of the predetermined user.

The device may further include a user identifier to identify a user, and the user customization parameter obtainer may obtain a user customization parameter corresponding to the identified user.

The foregoing and/or other aspects may be achieved by one or more embodiments providing an interfacing method of providing a UI exploiting a multi-modality, the method possibly including obtaining a scene parameter comprising information related to a scene, recognizing at least two modality inputs for controlling the scene, and generating scene control information based on the scene parameter and the at least two modality inputs.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which:

FIG. 4 illustrates an interfacing system for providing a UI exploiting a multi-modality according to one or more embodiments.

DETAILED DESCRIPTION

Figure 1:
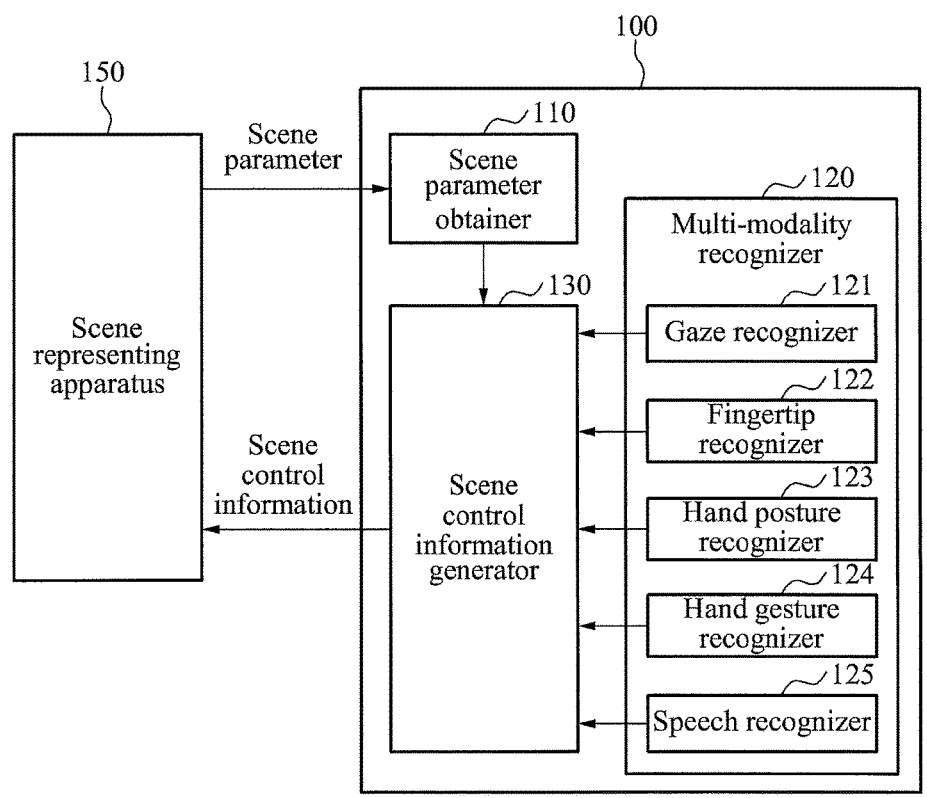
FIG. 1 illustrates an interfacing device for providing a user interface (UI) exploiting a multi-modality according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 illustrates an interfacing device 100 for providing a user interface (UI) exploiting a multi-modality according to one or more embodiments.

Referring to FIG. 1, the interfacing device 100 may provide a UI by exploiting a multi-modality.

Here, a modality refers to a primary sensory aspect, for example, a visual aspect or an auditory aspect. The multi-modality refers to a technique using a combination of at least two different types of modalities.

The interfacing device 100 may include a scene parameter obtainer 110, a multi-modality recognizer 120, and a scene control information generator 130. According to one or more embodiments, the interfacing device 100 may be implemented, for example, by a system on chip (SoC) including modules to perform the algorithm, or a processor to perform a program describing the algorithm, etc.

The scene parameter obtainer 110 may obtain a scene parameter. Here, a scene refers to multimedia contents provided to a user through a scene representing apparatus 150, and may include, for example, a plane image, a three-dimensional (3D) image, sound effects, and the like.

The scene parameter may include information related to a scene, in particular, information related to a characteristic of a scene interacting with a user.

For example, the scene parameter may include a parameter associated with a size of at least one object included in the scene or a parameter associated with a position of the at least one object. The at least one object may be controlled, individually, through the UI provided by the interfacing device 100.

In addition, the scene parameter may include, for example, a parameter associated with controlling a transition of the at least one object, a parameter associated with controlling a rotation of the at least one object, or a parameter associated with controlling a scale of the at least one object, etc. For example, the scene parameter may include, for example, information indicating whether the at least one object is movable, rotatable, or enlargeable or shrinkable based on an input of the user.

Further, the scene parameter may include a parameter associated with a viewpoint of the scene. For example, the scene parameter may include, for example, information related to a viewpoint of a scene currently being displayed, information regarding whether a viewpoint of the scene is changeable, a list of changeable viewpoints of the scene, or the like.

The multi-modality recognizer 120 may recognize at least two modality inputs for controlling the scene.

Although not shown in FIG. 1, the multi-modality recognizer 120 may receive sensor data from a sensor, and recognize the at least two modality inputs based on the received sensor data. Here, the sensor may include, for example, an image sensor configured to capture an object, a depth sensor configured to measure a distance to an object, a microphone configured to obtain audio data, and the like.

The multi-modality recognizer 120 may perform an algorithm for recognizing a multi-modality input using the received sensor data. According to one or more embodiments, the multi-modality recognizer 120 may be implemented, for example, by a system on chip (SoC) including modules to perform the algorithm, or a processor to perform a program describing the algorithm, etc.

The multi-modality recognizer 120 may include at least one of a gaze recognizer 121, a fingertip recognizer 122, a hand posture recognizer 123, a hand gesture recognizer 124, and a speech recognizer 125.

The gaze recognizer 121 may recognize a gaze of a user. Depending on a case, the gaze recognizer 121 may recognize a direction of the gaze, a position to which the gaze of the user is directed, or the like. The gaze recognizer 121 may process depth data received from the depth sensor or image data received from the image sensor to recognize the gaze of the user. In addition, the gaze recognizer 121 may sense a position of an eye of the user, an orientation of an eye of the user, or the like. In this example, the gaze recognizer 121 may use absolute coordinates indicating a 3D space in which the user is positioned, or relative coordinates determined based on a position of the interfacing device 100.

The fingertip recognizer 122 may recognize a fingertip of a user. Similarly, the fingertip recognizer 122 may recognize a direction in which the fingertip of the user points, a position pointed to by the fingertip of the user, or the like. The fingertip recognizer 122 may process depth data received from the depth sensor or image data received from the image sensor to recognize the fingertip of the user. In addition, the fingertip recognizer 122 may sense positions of both hands of the user, and positions of ten fingertips. In this example, the fingertip recognizer 122 may use absolute coordinates indicating a 3D space in which the user is positioned, or relative coordinates determined based on a position of the interfacing device 100.

The hand posture recognizer 123 may recognize a hand posture. For example, the hand posture recognizer 123 may recognize whether a hand of the user is taking a posture of rock, scissors, or paper. The hand posture recognizer 123 may process depth data received from the depth sensor or image data received from the image sensor to recognize the hand posture of the user. The hand posture recognizer 123 may recognize whether the hand of the user is taking a posture of pointing with an index finger, whether the hand of the user is taking a posture of gripping a pen with a thumb and an index finger, and the like.

In this example, the hand posture recognizer 123 may recognize the hand posture of the user using a hand posture database provided in advance. For example, the hand posture recognizer 123 may select a hand posture most similar to a sensed hand posture of the user from among a plurality of hand postures stored in the hand posture database, thereby recognizing the hand posture of the user. In this instance, the hand posture recognizer 123 may output a type of the selected hand posture.

The hand gesture recognizer 124 may recognize a hand gesture of the user. For example, the hand gesture recognizer 124 may recognize a movement pattern of the hand of the user. Depending on a case, the hand gesture recognizer 124 may recognize, for example, a movement of the hand of the user rotating on an axis of a wrist, a movement of the hand of the user moving drawing a circle centered at a predetermined point on a 3D space, a movement of the hand of the user moving in a 3D space, and the like. The hand gesture recognizer 124 may process depth data received from the depth sensor or image data received from the image sensor to recognize the hand gesture of the user.

In this example, the hand gesture recognizer 124 may recognize the hand gesture of the user, using a predetermined hand gesture database provided in advance. For example, the hand gesture recognizer 124 may select a hand gesture most similar to a sensed hand gesture from among a plurality of hand gestures stored in the hand gesture database, thereby recognizing the hand gesture of the user. In this instance, the hand gesture recognizer 124 may output a type of the selected hand gesture.

The speech recognizer 125 may recognize a speech of the user. In this instance, the speech recognizer 125 may recognize the speech of the user, and output contents of the recognized speech in a form of a text string. The speech recognizer 125 may process audio data received from the microphone to recognize the speech of the user.

The scene control information generator 130 may generate scene control information based on the at least two modality inputs recognized by the multi-modality recognizer 120 and the scene parameter obtained by the scene parameter obtainer 110.

Here, the scene control information refers to a control command customized for a scene, and may include, for example, information for controlling a viewpoint of the scene, an object included in the scene, or the like.

For example, the scene control information may include a Position element including information related to a predetermined position in the scene. The scene representing apparatus 150 may specify a target object to be controlled by the user, using the Position element included in the scene control information. Depending on a case, the Position element may be represented by 3D coordinates, two-dimensional (2D) coordinates, or the like.

The scene control information may include a Transform3D element including information related to a transformation of an object positioned at a predetermined position indicated by the Position element. The scene representing apparatus 150 may control a transformation of a target object specified by the Position element, using the Transform3D element included in the scene control information.

In this example, the scene representing apparatus 150 may, for example, move, rotate, or enlarge or shrink the target object, based on the Transform3D element. In particular, when the Transform3D element includes a command to move the target object to another point in the scene, the scene representing apparatus 150 may move the target object to the other point. When the Transform3D element includes a command to scale the target object up by a factor of two, the scene representing apparatus 150 may enlarge the target object by a factor of two.

The scene control information may include a Select element including information related to whether an object positioned at a predetermined position indicated by the Position element is selected. The scene representing apparatus 150 may control whether the target object specified by the Position element is selected, using the Select element included in the scene control information. For example, when the Transform3D element includes an indicator that selects the target object, the scene representing apparatus 150 may control the scene for the target object to be selected. As an alternative, the scene representing apparatus 150 may control the scene for the target object not to be selected.

The scene control information may include a Viewpoint element including information related to a viewpoint of the scene. The scene representing apparatus 150 may change a viewpoint of the scene, using the Viewpoint element included in the scene control information.

The scene control information may include a UserID element including information related to an identifier for identifying a user. The scene representing apparatus 150 may identify a user desiring to control the scene, using the UserID element included in the scene control information.

The scene control information may include an AssociatedPoints element including information related to a plurality of points associated with a specific position indicated by the Position element. The scene representing apparatus 150 may assist an operation of controlling the target object, additionally using the AssociatedPoints element included in the scene control information.

Depending on a case, the scene control information may further include information related to an effective pointing resolution. The scene representing apparatus 150 may assist in control of pointing to an object in the scene, using the information related to the effective pointing resolution.

The scene control information may include advanced UI device data formats, as shown in Table 1, for the command customized for the scene.

TABLE 1

| | |
|---|---|
| AUIDataFrame [[ | |
| SFVec3f | position |
| SFNode | Transform3D |
| SFBool | Select |
| SFNode | Viewpoint |
| SFString | UserID |
| MFVec3f | AssociatedPoints[N] |
| ]] | |

Here, the Position element may correspond to a type of single field $3^{rd}$ order vector with floating point representation (SFVec3f) representing 3D screen coordinates, pixels, or meters prescribed in binary format for scene (BIFS) settings, for example, BifsConfig.

The Transform3D element may correspond to a type of single field node (SFNode) representing a geometrical transformation intended by the user.

The Select element may correspond to a type of single field Boolean (SFBool) representing true when a scene object specified by the Position element is selected by the user.

The Viewpoint element may correspond to a type of SFNode representing a viewpoint of a scene intended by the user.

The UserID element may correspond to a type of single field string (SFString) representing a string variable for identifying each user.

The AssociatedPoints element may correspond to a type of multiple fields $3^{rd}$ order vectors with floating point representation (MFVec3f) representing a set of additional points associated with the Position element.

Figure 2A:
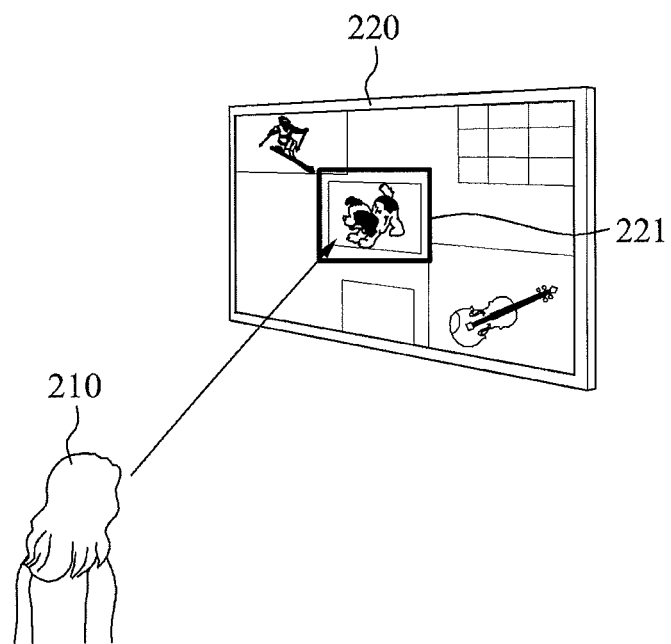
FIGS. 2A through 2C illustrate a UI exploiting a multi-modality according to one or more embodiments.
Figure 2B:
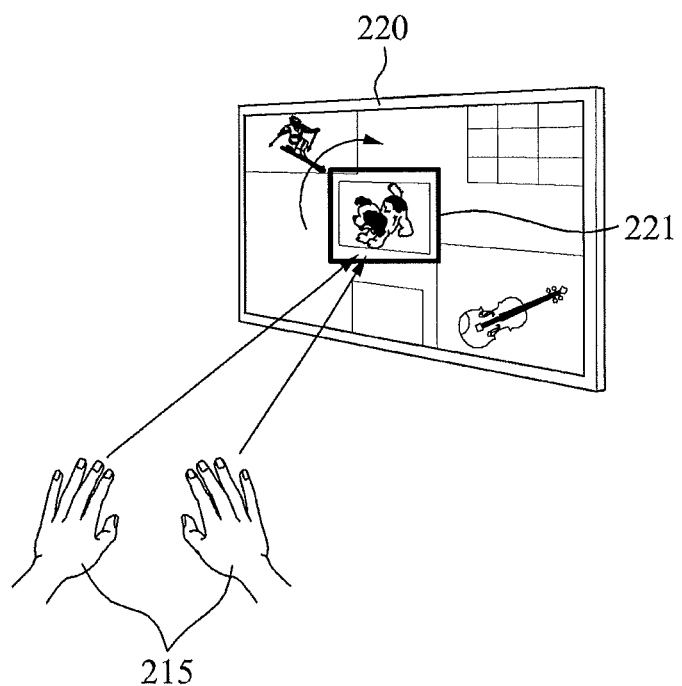
Figure 2C:
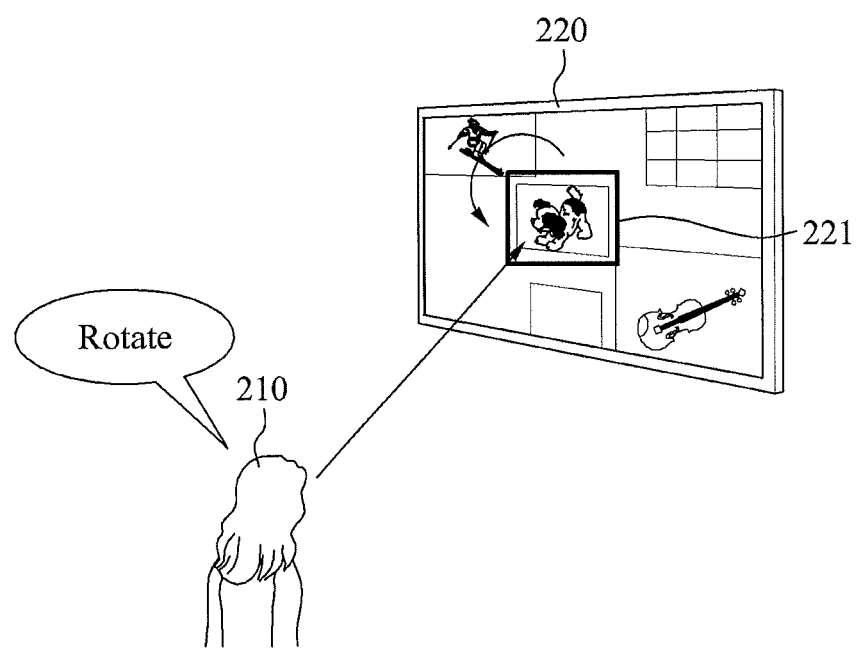

FIGS. 2A through 2C illustrate a UI exploiting a multi-modality according to one or more embodiments.

Referring to FIG. 2A, an interfacing device 220 may control pointing using a gaze modality.

For example, the interfacing device 220 may sense a gaze of a user 210, and determine an object 221 at which the user 210 desires to point, among a plurality of objects being displayed.

In addition, the interfacing device 220 may sense a gesture of the user 210 rapidly blinking eyes twice, a gesture of the user gazing at the object 221 at which the user is pointing continuously for a predetermined duration, for example, 3 seconds, and the like, and may control a scene for the pointed object 221 to be selected.

The aforementioned gestures are provided as exemplary examples and thus, a configuration of a multi-modality to be utilized by the interfacing device 220 is not limited thereto.

Referring to FIG. 2B, the interfacing device 220 may control a transformation using a both hands modality.

For example, the interfacing device 220 may recognize a gesture of both hands 215 of a user moving in a 3D space, and move, rotate, or enlarge or shrink the pointed object 221.

When the user makes a gesture of grabbing an object with a single hand, the interfacing device 220 may recognize the gesture, and select the pointed-to object 221.

When the user makes a gesture of grabbing an object with a single hand, and then takes a gesture of moving the hand in a predetermined direction, the interfacing device 220 may recognize the gestures, and move the pointed object 221 in a corresponding direction.

When the user makes a gesture similar to turning a steering wheel with both hands, the interfacing device 220 may recognize the gesture, and rotate the pointed object 221.

When the user makes a gesture of rotating a single hand on an axis of a wrist, the interfacing device 220 may recognize the gesture, and rotate the pointed object 221.

When the user makes a gesture of widening or narrowing a distance between both hands while having palms of the hands face each other, the interfacing device 220 may recognize the gesture, and enlarge or shrink the pointed object 221.

The aforementioned gestures are provided as exemplary examples and thus, a configuration of a multi-modality to be utilized by the interfacing device 220 is not limited thereto.

In this example, the interfacing device 220 may use the both hand modality and the gaze modality of FIG. 2A.

In detail, the interfacing device 220 may point to the object 221 by sensing a gaze of the user 210 through the gaze modality of FIG. 2A, and control the object 221 to be selected, moved, rotated, enlarged, or shrunk, by recognizing a movement of both hand of the user 210 through the both hand modality.

The aforementioned gestures are provided as exemplary examples and thus, a configuration of a multi-modality to be utilized by the interfacing device 220 is not limited thereto.

Referring to FIG. 2C, the interfacing device 220 may control a transformation using a gaze modality and a speech modality, simultaneously.

For example, the interfacing device 220 may select the object 221 by sensing a gaze of the user 210 through the gaze modality, and control the object 221 to be selected, moved, rotated, enlarged, or shrunk, by recognizing a speech of the user 210.

The aforementioned gestures described with reference to FIGS. 2A through 2C are provided as exemplary examples and thus, a configuration of a multi-modality to be utilized by the interfacing device 220 is not limited thereto.

Figure 3A:
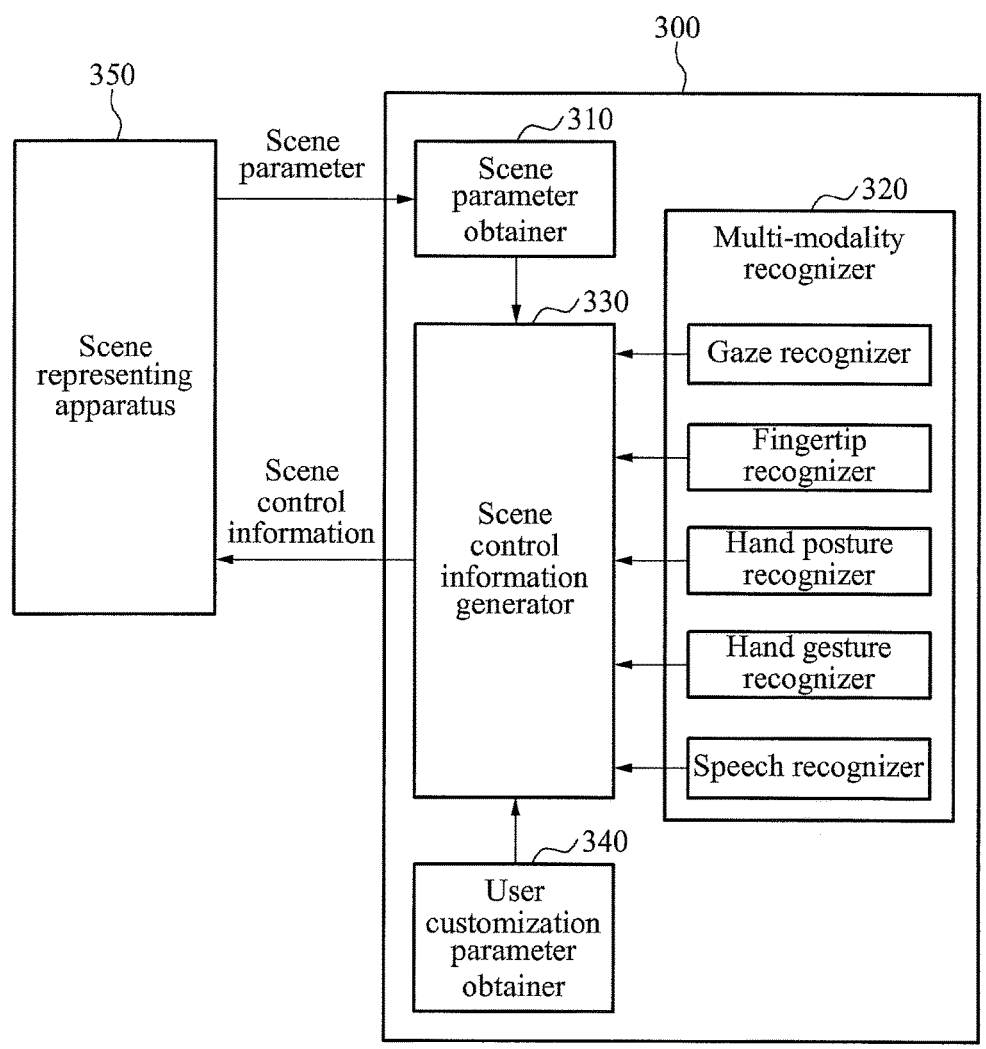
FIGS. 3A and 3B illustrate an interfacing device using a user customization parameter according to one or more embodiments.
Figure 3B:
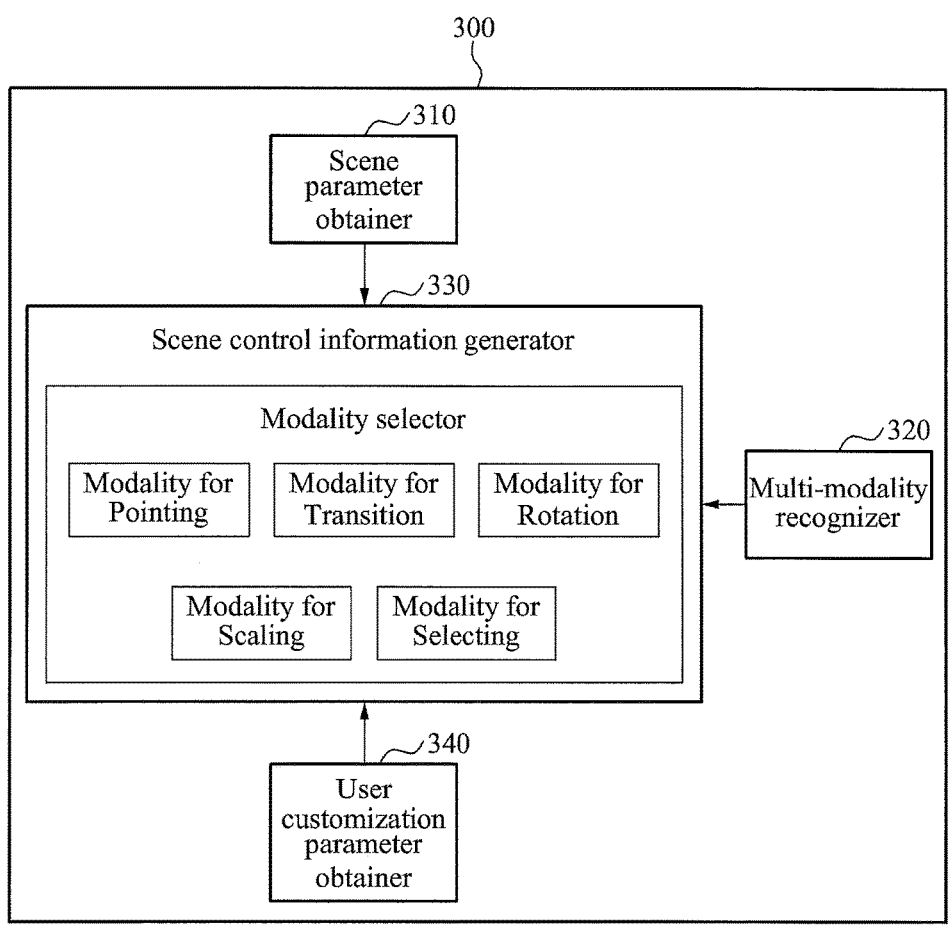

FIGS. 3A and 3B illustrate an interfacing device 300 using a user customization parameter according to one or more embodiments.

Referring to FIG. 3A, the interfacing device 300 may include a scene parameter obtainer 310, a multi-modality recognizer 320, a scene control information generator 330, and a user customization parameter obtainer 340. Here, the descriptions provided with reference to FIG. 1 may be applied identically to the scene parameter obtainer 310, the multi-modality recognizer 320, and the scene control information generator 330 and thus, a repeated description will be omitted herein for conciseness.

The user customization parameter obtainer 340 may obtain a user customization parameter.

Here, the user customization parameter may include mapping information corresponding to a predetermined user, and the mapping information may be used to map control aspects of a plurality of predetermined scenes to modalities corresponding to a preference of the corresponding user.

Referring to Table 2, a plurality of predetermined control aspects of a scene may include, for example, Pointing, Selecting, Transition, Rotation, Scaling, Viewpoint, and the like.

TABLE 2

| User Customization Parameters | Modalities |
| --- | --- |
| Pointing | Gaze, Index fingertip, Hand position |
| Selecting | Blinking, Hand grab posture, Time duration |
| Transition | Gaze with Select, Hand movement with Select, Speech with finger pointing direction, etc. |
| Rotation | Rotating both hands with grab postures, Hand open-palm normal direction, Hand motion with Select, Speech with motion |
| Scaling | Move closer toward each hand, Speech with finger pointing direction |
| Viewpoint | Head position, Hand position, Speech |

For example, the interfacing device 300 may obtain a first user customization parameter corresponding to a user A. In this example, the first user customization parameter may include mapping information to be used for controlling a scene using a combination of modalities or a modality preferred by the user A.

For example, the first user customization parameter may include mapping information indicating that a gaze modality may be used for controlling Pointing of an object included in the scene, an eye blinking modality may be used for controlling Select, and a speech modality may be used for controlling Transition, Rotation, Scaling, and a change of Viewpoint.

The first user customization parameter may be preset by the user A. The interfacing device 300 may obtain a parameter customized for the user A, thereby providing a UI customized for the user A.

As another example, the interfacing device 300 may obtain a second user customization parameter corresponding to a user B. In this example, the second user customization parameter may include mapping information to be used for controlling a scene using a combination of modalities or a modality preferred by the user B.

In this instance, the second user customization parameter may include mapping information differing from the mapping information included in the first user customization parameter. For example, the second user customization parameter may include mapping information indicating that a fingertip modality may be used for controlling Pointing of an object included in a scene, a hand gesture modality corresponding to, for example, hand grabbing, may be used for controlling Select, a hand gesture modality corresponding to, for example, movement of a hand, may be used for controlling Transition, a hand gesture modality corresponding to, for example, rotation of a hand, may be used for controlling Rotation, a speech modality may be used for controlling Scaling, and a head position modality corresponding to, for example, a relative position of a head of the user based on a screen, may be used for controlling a change of a viewpoint.

Similarly, the second user customization parameter may be preset by the user B. The interfacing device 300 may obtain a parameter customized for the user B, thereby providing a UI customized for the user B.

The scene control information generator 330 may interpret at least two modality inputs recognized by the multi-modality recognizer 320, based on the user customization parameter obtained by the user customization parameter obtainer 340.

Accordingly, although identical modality inputs may be recognized, the interfacing device 300 may generate different scene control information for each user customization parameter.

Although not shown in FIG. 3, the interfacing device 300 according to one or more embodiments may further include an identification unit.

In this example, the identification unit may identify a user who uses the interfacing device 300. A scheme of identifying a user by the identification unit may be implemented variously. For example, the identification unit may identify a user based on login information of the user. Also, the identification unit may identify a user by utilizing biometric information, for example, a face, an iris, a fingerprint of the user, and the like.

The user customization parameter obtainer 340 may obtain a user customization parameter corresponding to a user identified by the identification unit. Depending on a case, the user customization parameter obtainer 340 may obtain the user customization parameter from an accessible server through a wired network or a wireless network.

Accordingly, in a system using the interfacing device 300, users may use their own interfacing settings identically in various environments.

For example, a user C may use a first interfacing device for making a presentation at a workplace, a second interfacing device for watching movies at home, and a third interfacing device for manipulating a navigation system in an automobile.

According to the present embodiments, each of the first interfacing device, the second interfacing device, and the third interfacing device may identify the user C, and use a user setting parameter customized for the user C. Accordingly, the user C may manipulate various interfacing devices in an identical manner, using an input scheme optimized to the user C.

The interfacing device 300 may provide technology for customizing UI gestures preferred by a user, and generating various commands to be used for a scene automatically. Accordingly, the user may perform a desired manipulation by taking a gesture familiar to the user, without recognizing types of gestures to be used each time in various environments or various scenes.

Referring to FIG. 3B, the scene control information generator 330 may include a modality selector.

The modality selector may, for example, select, using the user customization parameter obtained by the user customization parameter obtainer 340, a modality for Pointing, a modality for Transition, a modality for Rotation, a modality for Scaling, a modality for Selecting, and the like.

Further, the scene control information generator 330 may interpret modality inputs, based on the modality for Pointing, the modality for Transition, the modality for Rotation, the modality for Scaling, and the modality for Selecting that are selected by the modality selector.

FIG. 4 illustrates an interfacing system for providing a UI exploiting a multi-modality according to one or more embodiments.

Referring to FIG. 4, an interfacing device 410 may provide a UI between a scene representing apparatus 420 and a user 430. Hereinafter, as an example, the interfacing device 410 may correspond to a smart phone of the user 430.

For example, the interfacing device 410 may include a first camera 411, a Bluetooth transceiver 412, a second camera 413, a microphone 414, an Internet communication unit 415, and a controller 416.

The interfacing device 410 may verify a position of the scene representing apparatus 420 using the first camera 411, and verify a position of the user 430 using the second camera 412. In addition, the interfacing device 410 may calculate a relative position between the scene representing apparatus 420 and the user 430.

Depending on a case, the interfacing device 410 may recognize a position of a face of the user 430 using the second camera 412, and transmit relevant information to the scene representing apparatus 430. Based on the information, the scene representing apparatus 420 may perform a parallax barrier operation, and the like for providing a 3D image to the user 430.

In this example, the interfacing device 410 may exchange data with the scene representing apparatus 420 using the Bluetooth transceiver 412. The interfacing device 410 may employ a near field communication scheme, in addition to a Bluetooth scheme. Although not shown in FIG. 4, the interfacing device 410 according to one or more embodiments may exchange data with the scene representing apparatus 420 through a cloud environment.

The interfacing device 410 may recognize a gaze of the user 430, a hand gesture of the user 430, and the like, using the second camera 413. The interfacing device 410 may recognize a speech of the user 430, using the microphone 414.

The interfacing device 410 may identify the user 430 using the second camera 413, and receive a user customization parameter corresponding to the identified user 430 from a remotely located server 440. The interfacing device 410 may access the remotely located server 440 using the internet communication unit 415.

The controller 416 may control the aforementioned operations. In particular, the controller 416 may interpret modality inputs of the user 430 based on the user customization parameter, and generate scene control information.

The interfacing device 410 may transmit the generated scene control information to the scene representing apparatus 420. The scene representing apparatus 420 may control a viewpoint of a scene, an object included in the scene, and the like, based on the scene control information.

In this example, the interfacing device 410 may generate control information to be used for controlling the scene through the scene representing apparatus 420, and transmit relevant information to the scene representing apparatus 420, rather than continuously transmitting sensed data or a result of the recognizing to the scene representing apparatus 420. Accordingly, the interfacing device 410 may provide technology for optimizing an amount of data to be transmitted and received to provide a UI.

The descriptions provided with reference to FIGS. 1 through 3B may be applied to the modules of FIG. 4 and thus, a detailed description will be omitted herein for conciseness.

Figure 5:
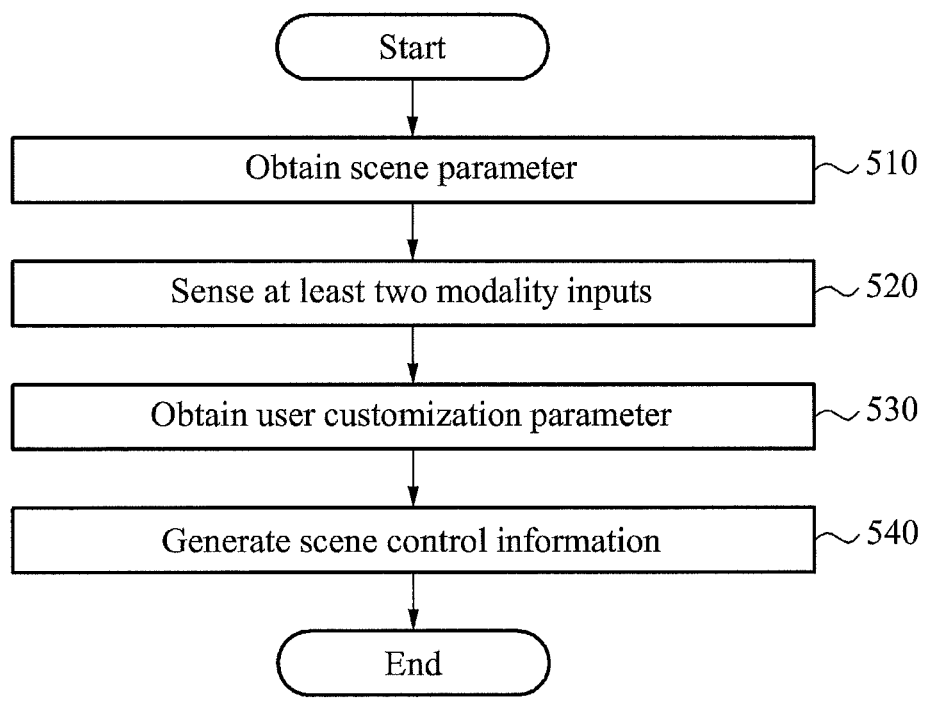
FIG. 5 illustrates an interfacing method of providing a UI exploiting a multi-modality according to one or more embodiments.

FIG. 5 illustrates an interfacing method of providing a UI exploiting a multi-modality according to one or more embodiments.

Referring to FIG. 5, the interfacing method according to the present embodiments may provide a UI exploiting a multi-modality.

In particular, in operation 510, a scene parameter including information related to a scene may be obtained. In operation 520, at least two modality inputs input by a user may be recognized. In operation 540, scene control information may be generated based on the scene parameter and the at least two modality inputs.

Depending on a case, in operation 530, a user customization parameter may be obtained. In such a case, in operation 540, the at least two modality inputs input by the user may be interpreted based on the user customization parameter.

The descriptions provided with reference to FIGS. 1 through 4 may be applied to the operations of FIG. 5 and thus, a detailed description will be omitted herein for conciseness.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An interfacing device for providing a user interface (UI) exploiting a multi-modality, the device comprising:
    one or more processors configured to:
        determine a user identity of a user;
        recognize at least two modality inputs for controlling a scene;
        obtain a scene parameter comprising information related to a characteristic of the scene, wherein the scene is configured to interact with the user;
        obtain a user customization parameter preset for the determined user identity, wherein the user customization parameter indicates that the scene parameter corresponds to the at least two modality inputs;
        generate, by processing the at least two modality inputs based on the scene parameter and based on the user customization parameter, scene control information; and
        select and manipulate at least one object in the scene based on the scene control information.

2. The interfacing device of claim 1, wherein the scene parameter comprises at least one of:
    a size parameter associated with a size of at least one object included in the scene;
    a position parameter associated with a position of the at least one object included in the scene;
    a transition parameter associated with controlling a transition of the at least one object included in the scene;
    a rotation parameter associated with controlling a rotation of the at least one object included in the scene;
    a scale parameter associated with controlling a scale of the at least one object included in the scene; or
    a viewpoint parameter associated with a viewpoint of the scene.

3. The interfacing device of claim 1, wherein the one or more processors are configured to:
    recognize a gaze of the user;
    recognize a fingertip of the user;
    recognize a hand posture of the user;
    recognize a hand gesture of the user; or
    recognize a speech of the user.

4. The interfacing device of claim 1, wherein the scene control information comprises at least one of:
    a Position element comprising information related to a predetermined position in the scene;
    a Transform3D element comprising information related to a transformation of an object positioned at the predetermined position;
    a Select element comprising information related to whether the object positioned at the predetermined position is selected;
    a Viewpoint element comprising information related to a viewpoint of the scene;
    a UserID element comprising information related to an identifier identifying the user; or
    an AssociatedPoints element comprising information related to a plurality of points associated with the predetermined position.

5. The interfacing device of claim 1,
    wherein the one or more processors are configured to interpret the at least two modality inputs based on the user customization parameter.

6. The interfacing device of claim 5, wherein:
    the user customization parameter comprises mapping information corresponding to a predetermined user; and
    the mapping information is used to map each of a plurality of control aspects of a plurality of predetermined scenes to one of the at least two modality inputs or to a combination of two or more of the at least two modality inputs, based on a preference of the predetermined user.

7. The interfacing device of claim 5, wherein:
    the one or more processors are configured to identify the user, and
    the user customization parameter corresponds to the identified user.

8. The interfacing device of claim 1, wherein the one or more processors are configured to receive sensor data input through a sensor, and recognize the at least two modality inputs based on the received sensor data.

9. The interfacing device of claim 1, wherein the one or more processors are configured to:
communicate with a scene representing apparatus providing a representation of the scene,
receive the scene parameter from the scene representing apparatus using the communication unit, and
transmit the generated scene control information to the scene representing apparatus using the communication unit.

10. The interfacing device of claim 9, wherein the one or more processors are configured to control the scene based on the scene control information, and represent the controlled scene.

11. The interfacing device of claim 1, wherein the user customization parameter is from among at least one user customization parameter preferred by at least one user and is used to control the scene using a combination of the at least two modality inputs preferred by the user.

12. An interfacing method of providing a user interface (UI) exploiting a multi-modality, the method comprising:
determining a user identity of a user;
recognizing at least two modality inputs for controlling a scene;
obtaining a scene parameter comprising information related to a characteristic of the scene, wherein the scene is configured to interact with the user;
obtaining a user customization parameter preset for the user identity, wherein the user customization parameter indicates that the scene parameter corresponds to the at least two modality inputs; and
generating, by processing the at least two modality inputs based on the scene parameter and based on the user customization parameter set for the user, scene control information; and
selecting and manipulating at least one object in the scene based on the scene control information.

13. The interfacing method of claim 12, further comprising:
obtaining the user customization parameter,
wherein the generating comprises interpreting the at least two modality inputs based on the user customization parameter.

14. The interfacing method of claim 13, wherein:
the user customization parameter comprises mapping information corresponding to a predetermined user; and
the mapping information is used to map at least one modality input among a plurality of modality inputs or a combination of two or more modality inputs selectable from among the plurality of modality inputs to a control aspect of a scene.

15. The interfacing method of claim 12, wherein the scene control information comprises at least one of:
a Position element comprising information related to a predetermined position in the scene;
a Transform3D element comprising information related to a transformation of an object positioned at the predetermined position;
a Select element comprising information related to whether the object positioned at the predetermined position is selected;
a Viewpoint element comprising information related to a viewpoint of the scene;
an UserID element comprising information related to an identifier identifying the user; or
an AssociatedPoints element comprising information related to a plurality of points associated with the predetermined position.

16. The interfacing method of claim 12, wherein the recognizing comprises at least one of:
recognizing a gaze of the user;
recognizing a fingertip of the user;
recognizing a hand posture of the user;
recognizing a hand gesture of the user; or
recognizing a speech of the user.

17. The interfacing method of claim 12, wherein the scene parameter comprises at least one of:
a size parameter associated with a size of at least one object included in the scene;
a position parameter associated with a position of the at least one object;
a transition parameter associated with controlling a transition of the at least one object;
a rotation parameter associated with controlling a rotation of the at least one object;
a scale parameter associated with controlling a scale of the at least one object; or
a viewpoint parameter associated with a viewpoint of the scene.

18. A non-transitory computer-readable medium storing instructions that, when executed by one or more processors, cause the one or more processors to perform the interfacing method of claim 12.

19. An interfacing method of providing a user interface, the method comprising:
determining a user identity of a user;
recognizing modality inputs for controlling a scene;
obtaining a scene parameter comprising information related to a characteristic of the scene, wherein the scene is configured to interact with the user;
obtaining a user customization parameter preset for the user identity, wherein the user customization parameter indicates that the scene parameter corresponds to at least one modality input among the modality inputs;
interpreting the modality inputs based on the user customization parameter; and
generating, based on the interpreted modality inputs and the scene parameter, scene control information; and
selecting and manipulating at least one object in the scene based on the scene control information.

\* \* \* \* \*